(12) United States Patent
Berger et al.

(10) Patent No.: US 9,718,340 B2
(45) Date of Patent: Aug. 1, 2017

(54) UNDERFLOOR UNIT FOR A MOTOR VEHICLE

(71) Applicant: Dr. Ing. h.c. F. Porsche Aktiengesellschaft, Stuttgart (DE)

(72) Inventors: Dennis Berger, Bietigheim-Bissingen (DE); Michael Werner, Besigheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 25 days.

(21) Appl. No.: 15/050,676

(22) Filed: Feb. 23, 2016

(65) Prior Publication Data

US 2016/0272245 A1 Sep. 22, 2016

(30) Foreign Application Priority Data

Mar. 17, 2015 (DE) .......................... 10 2015 103 904

(51) Int. Cl.
*B60K 1/00* (2006.01)
*B62D 25/20* (2006.01)
*B60K 1/04* (2006.01)

(52) U.S. Cl.
CPC ............... *B60K 1/00* (2013.01); *B60K 1/04* (2013.01); *B62D 25/20* (2013.01); *B60K 2001/005* (2013.01); *B60K 2001/0438* (2013.01); *B60Y 2306/01* (2013.01)

(58) Field of Classification Search
None
See application file for complete search history.

(56) References Cited

U.S. PATENT DOCUMENTS

| 4,167,889 A * | 9/1979 | Bohne ..................... F41H 5/013 89/36.02 |
| 2009/0104511 A1* | 4/2009 | Maguire ............. B60L 11/1874 429/120 |
| 2009/0108628 A1* | 4/2009 | Bharani ............... B62D 25/168 296/190.08 |

FOREIGN PATENT DOCUMENTS

| DE | 10 2013 106 080 | 12/2014 |
| DE | 102013106080 A1 * | 12/2014 |

\* cited by examiner

*Primary Examiner* — J. Allen Shriver, II
*Assistant Examiner* — Hilary L Johns
(74) *Attorney, Agent, or Firm* — Gerald E. Hespos; Michael J. Porco; Matthew T. Hespos

(57) ABSTRACT

An underfloor unit (10) for protecting components of a motor vehicle, in particular a traction battery for electrically driving the motor vehicle, from ground impacts is provided. The underfloor unit (10) has a floor panel (12) for covering the motor vehicle component on the ground side and a plurality of separate impact protection tiles (16) connected to the floor panel (12) and intended for taking up ground impacts. As a result of the multiplicity of impact protection tiles (16), only individual impact protection tiles (16) need be exchanged on being subjected to a hard absorbed ground impact, thus making it possible to have a motor vehicle with low maintenance and/or repair costs.

11 Claims, 2 Drawing Sheets

UNDERFLOOR UNIT FOR A MOTOR VEHICLE

CROSS REFERENCE TO RELATED APPLICATION

This application claims priority under 35 USC 119 to German Patent Appl. No. 10 2015 103 904.4 filed on Mar. 17, 2015, the entire disclosure of which is incorporated herein by reference.

BACKGROUND

1. Field of the Invention

The invention relates to an underfloor unit for a motor vehicle that protects components of the motor vehicle on the ground side.

2. Description of the Related Art

A body of a motor vehicle can have a load-bearing supporting structure with solid longitudinal members and solid crossmembers connected to one another to form a supporting frame and a stable platform to which the remaining components of the motor vehicle can be connected. The supporting structure can support a drive, individual body parts, functional units of the motor vehicle and a payload, and can dissipate the weight forces thereof to an underlying surface. An underfloor unit can be connected to the supporting structure. The underfloor unit forms the underfloor of the motor vehicle and covers and protects components arranged above the underfloor unit with respect to the underlying surface.

DE 10 2013 106 080 A1 discloses an underfloor unit formed entirely from a fiber-reinforced plastic and with a metal sheet on its underside.

There is a constant requirement to reduce the maintenance and repair costs of a motor vehicle. Accordingly, it is an object of the invention to have a motor vehicle with low maintenance and/or repair costs.

SUMMARY

The invention relates to an underfloor unit for protecting motor vehicle components of a motor vehicle, in particular a traction battery for electrically driving the motor vehicle, from ground impacts. The underfloor unit has a floor panel for covering the motor vehicle component on the ground side and a plurality of separate impact protection tiles connected to the floor panel and intended for taking up ground impacts.

The impact protection tiles make it possible for the actual floor panel and the motor vehicle components arranged above the floor panel to be protected from damage by ground impacts. If, for example, the underfloor unit strikes an obstacle on the ground, for example a curbside or a bollard, the impact protection tiles can take up, and preferably at least partially absorb, the impact energy. Given the large number of impact protection tiles, each impact protection tile covers only a correspondingly small part of the floor panel. In the event of the underfloor unit colliding with an obstacle on the ground, or in the event of an object striking the underfloor unit from below, only the particular impact protection tile that has come into contact therewith is affected. If the impact should cause a plastic deformation or a breakage of the relevant impact protection tile, only this impact protection tile and not the remaining unaffected impact protection tiles and/or the floor panel need be exchanged during a maintenance and/or repair operation. Thus, the costs for replacement parts and costs for mounting can be reduced. As a result of the multiplicity of impact protection tiles, only individual impact protection tiles need be exchanged on when subjected to a hard absorbed ground impact, thus making it possible to have a motor vehicle with low maintenance and/or repair costs.

The floor panel can be produced from a metallic material, for example steel. The floor panel may be produced from a material that is softer and/or lighter than steel, for example aluminum. Sufficient impact protection can be achieved by the multiplicity of impact protection tiles so that the material of the floor panel can be selected with a greater emphasis on lightweight construction. An upper side of the floor panel facing away from the impact protection tiles may have at least one receiving depression for at least partially receiving a motor vehicle component, such as a traction battery for electrically driving the motor vehicle. Thus, a traction battery can be connected in a mechanically stable manner to the floor panel and can be coupled thermally to the floor panel for cooling the traction battery. The impact protection tiles may be substantially square or rectangular. As a result, the impact protection tiles easily can be applied so as to adjoin one another in immediate proximity. Regions of the floor panel not covered by the impact protection tiles thus can be minimized.

The impact protection tile may be produced from a metal, in particular steel and/or aluminum, and/or a fiber composite. As a result, the impact protection tile can have sufficient strength and sufficient elastic and/or plastic deformability to be able to take up and at least partially absorb the impact energy of a ground impact.

The floor panel may have a cooling duct open toward the impact protection tile and intended for cooling the motor vehicle component. A cooling fluid conducted through the cooling duct can cool a motor vehicle component arranged above the floor panel and thermally coupled to the floor panel, such as a traction battery for electrically driving the motor vehicle. The cooling duct is open on one side and can be provided easily and cost-effectively in the floor panel. Thus, it is not required to subsequently introduce the cooling duct through a bore made with a corresponding length. The open side of the cooling duct can be covered by the at least one impact protection tile and in particular sealed, with the result that leakage of the cooling fluid is avoided or at least kept low.

A resilient and/or flexible sealing mat may be provided between the floor panel and the impact protection tile for sealing the cooling duct with respect to the impact protection tile. The sealing mat may be configured as a sealing plate, and can sufficiently seal the cooling duct that is open on one side. As a result, a leaktight cooling duct is present even if an impact protection tile covering the cooling duct is deformed or broken.

Plural identical impact protection tiles may be provided. The number of identical parts is thus high, with the result that production can take place more cost-effectively. In addition, the exchange of individual impact protection tiles is facilitated.

At least two impact protection tiles may be connected to the floor panel so as to be behind one another in the direction of travel and/or at least two impact protection tiles are connected to the floor panel so as to be next to one another transversely to the direction of travel. For the number N of impact protection tiles arranged behind another in the direction of travel and/or next to one another transversely to the direction of travel, it holds that $2 \leq N \leq 30$, in particular $3 \leq N \leq 25$, preferably $4 \leq N \leq 20$, more preferably $5 \leq N \leq 15$, and particularly preferably 6≤N≤10. The number of impact protection tiles can thus be low enough that the mounting effort during production, maintenance and/or repair is low, and at the same time the number of impact protection tiles is high enough that, in the case of an absorbed hard impact, unaffected regions do not have to be exchanged as well.

The impact protection tiles may be inserted in a countersunk manner in a corresponding depression of the floor panel. Thus, an impact protection side of the impact protection tiles that faces the roadway surface and an underside, facing the roadway surface, of a frame part of the underfloor that is provided outside the impact protection tiles are substantially in a common plane. The impact protection tiles can be integrated in a substantially flush manner into the shape profile of the floor panel. As a result a flow-optimized underside of the underfloor unit with a low air resistance is obtained.

The impact protection tile may have at least one fastening opening for fastening the impact protection tile to the underfloor. A releasable fastening means, in particular a screw, is inserted in a completely countersunk manner in the fastening opening. The impact protection tile thus easily can be demounted and replaced by another impact protection tile. Moreover, the countersunk arrangement of the fastening means makes it possible to achieve a low air resistance of the underfloor unit.

Above a predefined limiting force, the impact protection tiles are designed to absorb impact energy by plastic deformation and/or breaking. By taking up deformation energy, the impact protection tiles can absorb the impact energy of a sufficiently strong impact. The deformed and/or broken impact protection tile then easily can be exchanged and replaced by a new non-deformed impact protection tile.

The invention further relates to an electrically drivable motor vehicle, in particular a hybrid motor vehicle or a purely electric motor vehicle, having a traction battery for purely electrically driving the motor vehicle and an underfloor unit that covers the traction battery on the ground side. The underfloor unit can be formed and developed as described above. The traction battery is well protected by the impact protection tiles and can, where appropriate, be passively cooled by the underfloor unit. As a result of the multiplicity of impact protection tiles, only individual impact protection tiles need be exchanged on being subjected to a hard absorbed ground impact, thus making it possible to have a motor vehicle with low maintenance and/or repair costs.

The invention is explained below by way of example with reference to the accompanying drawings on the basis of preferred exemplary embodiments, wherein the features presented below both each on their own and in combination can represent one aspect of the invention.

DETAILED DESCRIPTION

Figure 1:
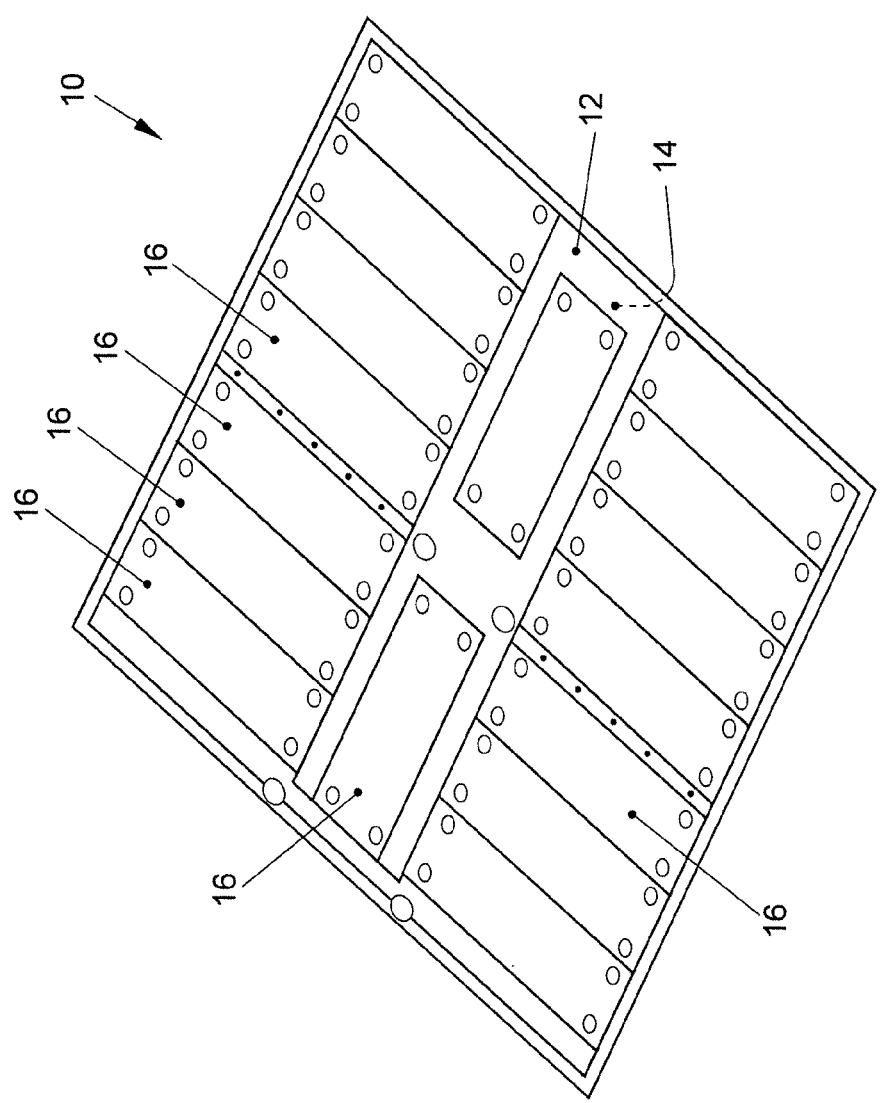
FIG. 1 is a schematic perspective view of an underfloor unit from below.

The underfloor unit 10 illustrated in FIG. 1 for a motor vehicle has a floor panel 12 with an underside 14 and a plurality of in identically configured rectangular impact protection tiles 16 secured to the underside 14. The impact protection tiles 16 are arranged substantially directly next to one another in edge-to-edge relationship at the lateral ends of the underfloor unit 10. As a result the floor panel 12 is covered in these regions by the impact protection tiles 16 substantially without gaps.

Figure 2:
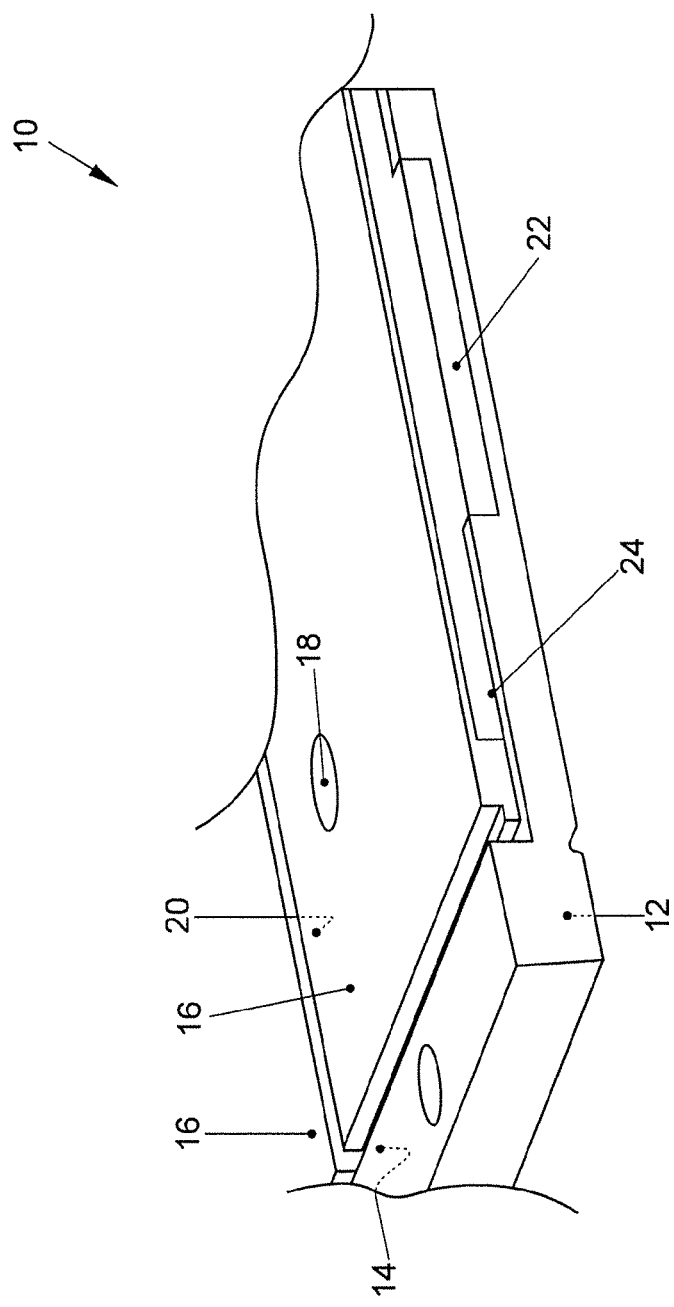
FIG. 2 is a schematic perspective sectioned detail view of the underfloor unit of FIG. 1.

As illustrated in FIG. 2, the impact protection tiles 16 can be screwed to the underfloor 12 by screws received in a countersunk manner in fastening openings 18. The impact protection tiles 16 are received in a countersunk manner in the floor panel 12 and have impact protection sides 20 that are arranged substantially in a common plane with the underside 14 of the regions of the floor panel 12 that are not covered by the impact protection tiles 16, for example a frame part of the underfloor 12, to achieve as low a flow resistance as possible for the underfloor unit 10.

In the illustrated embodiment, cooling ducts 22 are provided in the floor panel 12 and open toward the impact protection tiles 16. The cooling ducts 22 enable active cooling and/or temperature control of a traction battery placed on the floor panel 12 and intended for purely electrically driving the motor vehicle. In the region of the cooling duct 22, a plate-like sealing mat 24 is provided between the impact protection tile 16 and the floor panel 12 and spans the cooling duct 22 while being pressed in a sealing manner between the impact protection tile 16 and the floor panel 12. The sealing mat 24 can be received in an at least partially embedded manner in the impact protection tile 16 and/or the floor panel 12. Thus, a correspondingly large thickness can be provided for the sealing mat 24.

What is claimed is:

1. An underfloor unit for protecting components of a motor vehicle, in particular a traction battery for electrically driving the motor vehicle, from ground impacts, comprising:
a floor panel for covering a side of the motor vehicle component facing the ground, the floor panel having an underside facing the ground, the underside of the floor panel being formed with at least one downwardly concave depression;
a plurality of identically configured separate impact protection tiles mounted in the at least one depression and connected to the underside of the floor panel at positions for taking up ground impacts, the impact protection tiles covering a major part of an area of the underside of the floor panel;
at least one cooling duct formed in the floor panel and open towards the plurality of impact protection tiles and configured for cooling the motor vehicle component; and
a resilient sealing mat between the floor panel and the plurality of impact protection panels for sealing the cooling duct with respect to the plurality of impact protection tiles.

2. The underfloor unit of claim 1, wherein the impact protection tiles are produced from at least one of steel, aluminum and a fiber composite.

3. The underfloor unit of claim 1, wherein at least two of the impact protection tiles are connected to the floor panel so as to be side-by-side in at least one of a direction of travel and a direction transverse to the direction of travel, wherein, for a number N of impact protection tiles arranged side-by-side in the direction of travel and the direction transverse to the direction of travel is such that 2≤N≤30.

4. The underfloor unit of claim 1, wherein the impact protection tiles are countersunk in the at least one depressions of the floor panel so that impact protection sides of the impact protection tiles that face the ground are in a common plane with an underside of a frame part of the floor panel that is provided outside the impact protection tiles.

5. The underfloor unit of claim 1, wherein each of the impact protection tiles has at least one fastening opening for fastening the impact protection tiles to the underfloor, and wherein a releasable fastening is inserted and countersunk in the fastening opening.

6. The underfloor unit of claim 1, wherein the impact protection tiles are designed to absorb impact energy by plastic deformation or breaking.

7. An electrically drivable motor vehicle, comprising: a traction battery for purely electrically driving the motor vehicle and the underfloor unit of claim 1 and disposed in a position for covering the traction battery on a ground side.

8. The underfloor of claim 1, wherein the at least one cooling duct is formed by at least one recessed area of the depression in the underside of the floor panel, the resilient sealing mat covering the at least one recessed area of the depression, an upper side of each of the impact protection tiles being configured to nest with the resilient sealing mat.

9. An underfloor unit for protecting components of a motor vehicle from ground impacts, comprising:

a floor panel for covering a side of the motor vehicle components facing the ground, the floor panel having an underside facing the ground, the underside of the floor panel being formed with at least one downwardly concave depression;

a plurality of separate impact protection tiles mounted in the at least one depression so that the impact protection tiles cover a major part of an area of the underside of the floor panel, the impact protection tiles being disposed so that each of impact protection tiles is in edge-to-edge relationship with at least one other of the impact protection tiles or with a peripheral area of the depression, each of the impact protection tiles being formed with apertures extending therethrough; and fasteners passing through the respective apertures in the impact protection tiles and releasably fastening the impact protection tiles to the floor panel so that the impact protection tiles can be replaced individually in the event of damage or breakage caused by ground impact.

10. The underfloor of claim 9, wherein the impact protection tiles are substantially identical to one another.

11. The underfloor unit of claim 9, wherein surfaces of the impact protection tiles that face the ground are substantially flush with one another.

* * * * *